United States Patent [19]

See

[11] 3,737,629

[45] June 5, 1973

[54] OPTICAL CODE READER

[75] Inventor: Gary G. See, Euclid, Ohio

[73] Assignee: Addressagraph-Multigraph Corporation, Cleveland, Ohio

[22] Filed: June 9, 1971

[21] Appl. No.: 151,191

[52] U.S. Cl...........235/61.1 E, 250/227, 340/146.3 T

[51] Int. Cl.........G06k 7/15, G01n 21/30, G06k 9/04

[58] Field of Search........................250/227, 219 DC; 235/61.11 E, 61.12 N, 61.11 R, 61.9 R, 61.7 B; 226/24; 340/146.3 T, 149 A

[56] References Cited

UNITED STATES PATENTS

| | | | |
|---|---|---|---|
| 3,513,298 | 5/1970 | Riddle | 235/61.11 D |
| 3,578,953 | 5/1971 | Milford | 235/61.11 E |
| 3,533,657 | 10/1970 | De Silva | 235/61.11 E |
| 3,430,057 | 2/1969 | Genahr | 250/227 |
| 3,305,689 | 2/1967 | Leavy | 250/227 |
| 3,444,517 | 5/1969 | Rabinow | 340/146.3 T |
| 3,418,456 | 12/1968 | Hamisch | 235/61.11 E |
| 3,354,319 | 11/1967 | Loewen | 250/227 |
| 3,427,440 | 2/1969 | Ruscher | 235/61.9 A |
| 3,548,160 | 12/1970 | Welsh | 235/61.6 M |

*Primary Examiner*—Maynard R. Wilbur
*Assistant Examiner*—Robert M. Kilgore
*Attorney*—Russell L. Root and Ray S. Pyle

[57] ABSTRACT

An optical code reader for reading a plurality of code groups on a single pass of a coded member, such as a tab card, rotatable disc or rotatable drum. The code reader includes light transmitting means, such as an array of fiber optic tubes, to illuminate a laterally extending surface area of the coded member. Light conveying means, such as arrays of fiber optic tubes, are provided for receiving light reflected from the coded member and transmitting the light to light sensors at remote locations. The light sensors may be adjustably positioned so as to be associated with different code groups located at different lateral positions on the code carrying member.

11 Claims, 11 Drawing Figures

GARY G. SEE
INVENTOR
BY Roy S Pyle
ATTORNEY

GARY G. SEE
INVENTOR
BY Roy S. Pyle
ATTORNEY

OPTICAL CODE READER

BACKGROUND OF THE INVENTION

This invention relates to the art of code readers and, more particularly, to an improved optical code reader which may be employed for reading more than one code.

The invention is particularly applicable in conjunction with optically reading coded information on a coded tab card and will be described with particular reference thereto; however, it is to be appreciated that the invention may be employed for reading coded information on various coded members, such as rotatable coded discs and coded drums.

Information is frequently coded and stored on coded members, such as tab cards, rotatable discs and rotatable drums for subsequent information on retrieval, as with the use of a digital computer. The information stored is normally coded so that it may be converted into a format typically used by digital computers, such as binary "1" and "0" electrical signals. The coded information may be stored and retrieved with various types of systems, including, for example, optical and magnetic systems. Optical systems employ codes which are normally made up of a pattern of optical marks; to wit, light reflective and non-reflective code areas. Different types of codes are known within the optical systems and include, for example, bar code, mark read code, computer ones code and Hollerith code. Each of these codes is similar in that they include a plurality of aligned code areas which are light reflective or non-reflective dependent on the nature of the information stored. The codes are typically read with an optical reader which includes a light source for illuminating a code group together with one or more light sensors for detecting the pattern of light reflected.

A significant problem encountered with optical code readers is that they are usually designed for a specific code type and, hence, are not adapted to read other code types. This is because the code types differ in that, for example, the code areas may be spaced by different distances or may be of different size or shape or may be punched, as in the Hollerith code. Also, the code types may be located at different positions on a coded member. This is particularly true with tab cards which, depending on the code employed, may have the coded areas positioned at different lateral locations on the card.

SUMMARY OF THE INVENTION

The present invention is directed toward an optical code reader adapted to read various different types of codes appearing at different locations on code carrying members.

In accordance with the present invention the optical code reader includes apparatus for transmitting light in such a manner to impinge upon a laterally extending surface area of a coded member, with the surface area being of sufficient length and width to illuminate a plurality of laterally spaced code areas on the member. A plurality of light conveying means, such as fiber optic tubes, are provided with each having one end positioned to receive light reflected from an associated one of the laterally spaced code areas, and each serves to transport the light received to an opposite end which is positioned at a location remote from the code member to thereby provide a pattern of light and no light in dependence upon the code areas illuminated. A lesser plurality of light sensors, such as photodiodes or phototransistors, are located at the remote location and are associated with a selected group of the opposite ends for receiving light therefrom in a coded pattern in dependence upon the coded pattern of an associated group of illuminated dependence upon the coded pattern of an associated group of illuminated code areas. The light sensors are adapted to be adjustably positioned relative to the opposite ends of the conveying means so as to optically read different groups of code areas.

In accordance with a more limited aspect of the present invention, the light conveying means, which may be fiber optic tubes, are aligned in an array for receiving light reflected from code areas which are laterally arranged on a code carrying member, and the array is carried by a support member to which a second support member carrying the light sensors is adjustably secured so that the sensors may receive light from different groups of code areas.

In accordance with a still further aspect of the present invention, the optical code reader employs at least two longitudinally spaced arrays of light conveying means, such as fiber optic tubes, with each array serving to receive light reflected from laterally aligned code areas on a code member.

In accordance with a still further aspect of the present invention, more than one sensor support is provided for at least one array of light conveying means so that on a single pass of a coded member, a plurality of laterally spaced code groups may be read.

Still further in accordance with the present invention, the support member carrying the arrays of light conveying means also serves to carry light transporting means, such as fiber optic tubes, for transmitting light from a remote location to the code carrying member.

The primary object of the present invention is to provide an improved optical code reader which is relatively compact in size and economical to manufacture.

A still further object of the present invention is to provide an optical code reader adapted to optically read different types of codes.

A still further object of the present invention is to provide an optical code reader for reading different types of codes and which may be easily positioned to different locations relative to a code carrying member so as to read variously located code groups.

A still further object of the present invention is to provide an optical code reader which, on a single pass of a coded member, may read several different types of codes carried by the member.

A still further object of the present invention is to provide an optical code reader adapted to read various types of codes with light sensors located remote from the code carrying member and without the need for complex optical lens systems.

The foregoing and other objects and advantages of the invention will be more readily appreciated from the following description of the preferred embodiment of the invention taken in conjunction with the accompanying drawings.

IN THE DRAWINGS

DESCRIPTION OF THE PREFERRED EMBODIMENTS

Figure 1:
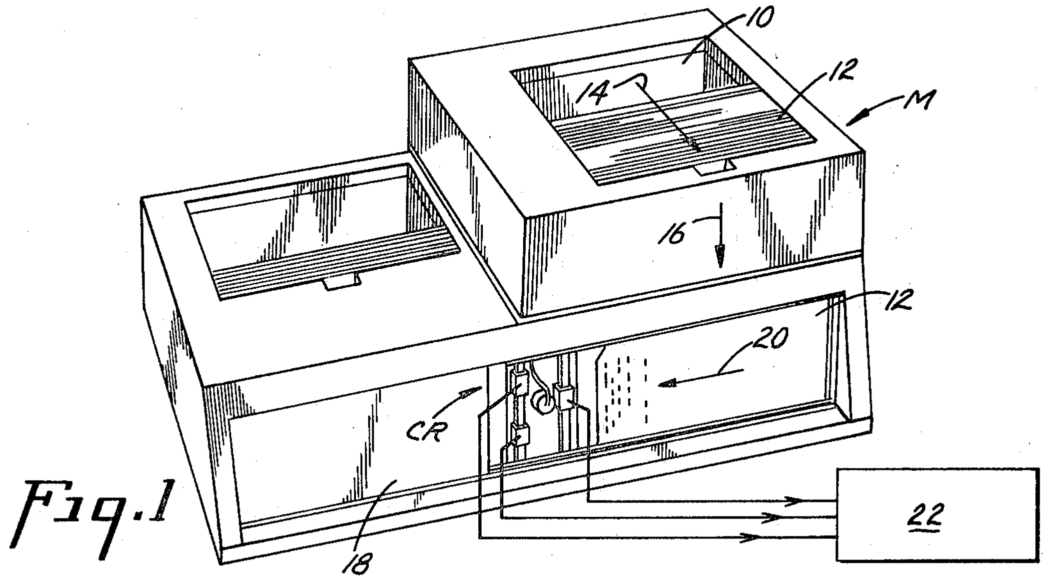
FIG. 1 is a simplified perspective illustration of a code reader, constructed in accordance with the invention, used in conjunction with a tab card feed mechanism.

Referring now to the drawings wherein the showings are for purposes of illustrating the preferred embodiment of the invention only and not for purposes of limiting same, FIG. 1 is a simplified illustration of a portion of a tab card feed mechanism M which, in a conventional manner, includes a trough 10, or the like, for receiving a plurality of coded tab cards 12 standing in upright fashion. The cards are driven by suitable means toward the front of the machine, as generally indicated by arrow 14, with each card then displaced from the trough 10 downwardly, as indicated by arrow 16, to a track or bed 18. Each card is then displaced along bed 18 in the direction of arrow 20 so as to be transported through an optical code reader CR, the subject of this invention, where the coded information is read and applied through electrical circuits to a utilization means, such as a digital computer 22. The card feeder machine M, in itself, does not form a part of the present invention and, hence, has been described hereinabove with respect to a simplified illustration. The code reader CR may be employed with various different types of card feeding machines.

Figure 2:
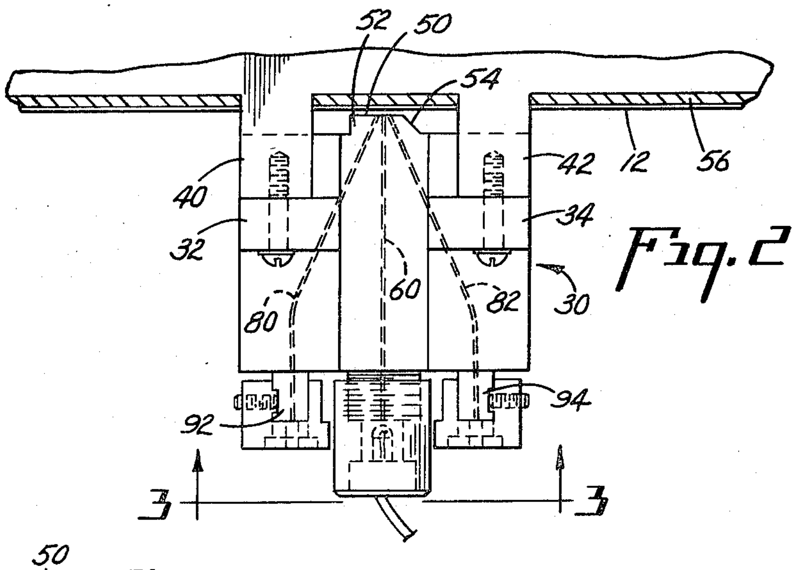
FIG. 2 is a plan view of the code reader shown in FIG. 1.

In accordance with the present invention, the card reader CR, as best shown in FIGS. 2 through 6, includes a support 30 provided with suitable corner flanges 32, 34, 36 and 38 to facilitate mounting to machine M, with the code reader straddling track bed 18 and providing sufficient clearance for each card 12 to be passed between track bed 18 and the card facing surface of the card reader. Corner flanges 32, 34, 36 and 38 are secured to machine M, as with machine screws, to extension flanges, such as flanges 40 and 42, extending from the machine. As best shown in FIG. 2, the card facing surface 50 of support 30 is provided with an extension 52 having a cammed portion 54. While not shown in the patent drawings, card feeder machine M employs driver and idler wheels which maintain each card 12 against layer 56 on track bed 18 while the card is being transported through the card reader. Cam surface 54 is particularly useful to prevent the forward edge of a card 12 from buckling outwardly toward the facing surface 50 of support 30.

Figure 4:
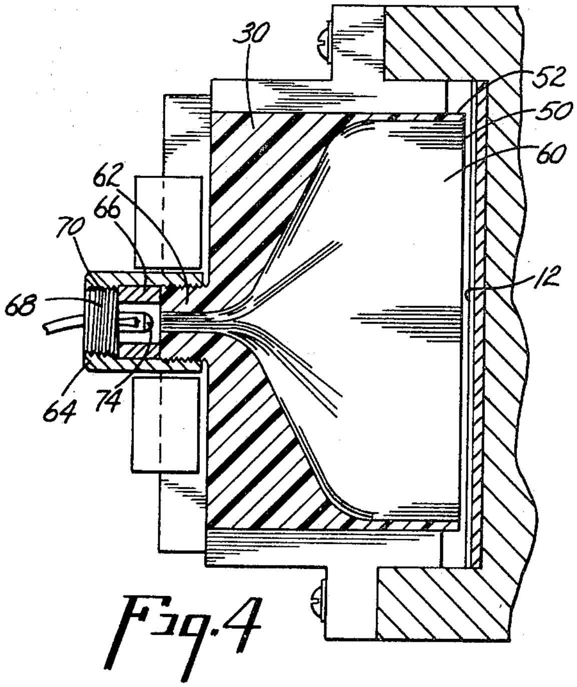
FIG. 4 is a sectional view of the code reader taken generally along line 4—4 in FIG. 3 looking in the direction of the arrows.
Figure 5:
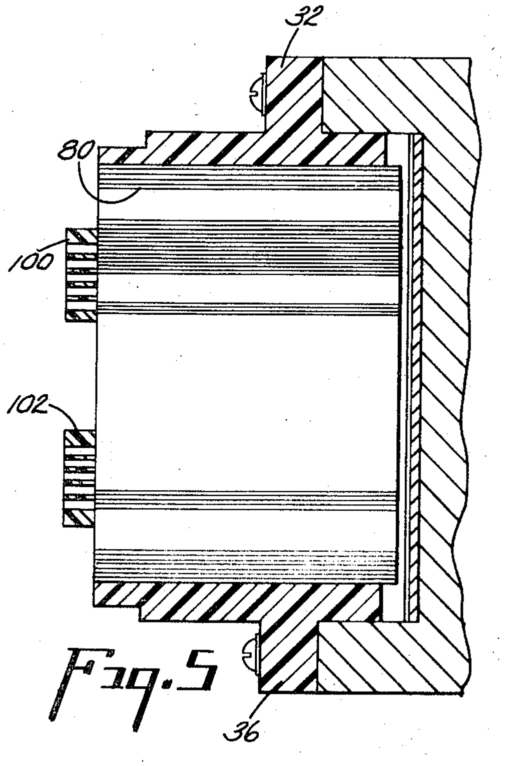
FIG. 5 is a sectional view following along the fiber bundle taken generally along line 5—5 in FIG. 3 looking in the direction of the arrows.

Support 30 serves to support an array 60 of light transmitting fiber optic tubes. As best shown in FIGS. 2 and 4, the fiber optic tubes have their card facing ends aligned in uniformly spaced relationship so as to extend laterally across the card facing surface 50 of extension 52. The card facing ends are polished so as to be flush with surface 50. Array 60 extends inwardly through support 30 and the tubes are bundled at their opposite ends as they extend through the center portion of a threaded shaft 62, which extends in the direction away from bed 18. A tubular sleeve 64 is threaded to shaft 62 and receives an annular spacer 66 held in place against the exposed end of shaft 62 by a lamp 68. The lamp has a threaded portion 70 which is threaded into sleeve 64 so that the forward end of the lamp engages one end of spacer 66. The spacer provides a cavity in which the lens 74 of the lamp is received. Preferably, lens 74 is of the magnifying type so that when the lamp is energized light emitted from the lamp will be focused upon the exposed terminal ends of the bundled fiber optic tube of array 60. The spacing between the card facing tube ends of array 60 and a coded card 12 is such that a narrow laterally extending, continuous beam of light will impinge upon the card's surface. This beam, as will be described in greater detail hereinafter, is of sufficient width and length to illuminate a plurality of laterally arranged code groups, each having, in turn, a plurality of coded areas of light reflecting and non-reflecting characteristics.

Support 30 also carries two arrays 80 and 82 of fiber optic tubes. These two arrays are longitudinally spaced on opposite sides of array 60, as shown, for example, in FIG. 6. Like array 60, each of these two arrays is comprised of a plurality of fiber optic tubes having their card facing ends located in extension 52 with the ends of the tubes being polished and flush with card facing surface 50. The card facing ends are uniformly spaced and aligned so as to extend laterally throughout substantially the entire length of extension 52, which is a distance approximately equal to the lateral width of a coded tab card 12. Unlike array 60, however, each of the arrays 80 and 82 has its respective fiber optic tubes arranged coherently through the support member 30 from extension 52 to their opposite ends. Array 80 extends at an angle of approximately 24° from array 60 toward side surface 84 of support 30 and then through the support into a protuberance 86. Protuberance 86 extends laterally along the length of support 30 and outwardly in a direction away from card facing surface 50. Similarly, the fiber optic tubes of array 82 are arranged so as to extend at an angle of approximately 24° from array 60 toward side surface 88 of support 20 and, thence, through the block to terminate in a laterally extending protuberance 90, similar to that of protuberance 86. Protuberances 86 and 90 are respectively provided with flat surfaces 92 and 94 at which arrays 80 and 82, respectively, terminate. Whereas various material may be used for support 30, it is preferred that the support be made of a plastic material so that the plastic may be molded about preassembled arrays 60, 80 and 82.

Figure 6:
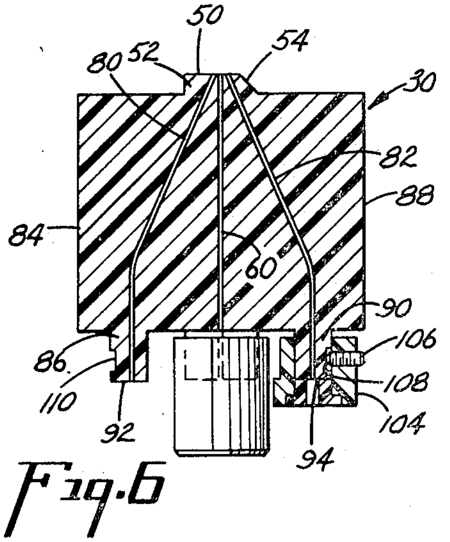
FIG. 6 is a sectional view taken generally along line 6—6 in FIG. 3 looking in the direction of the arrows.
Figure 3:
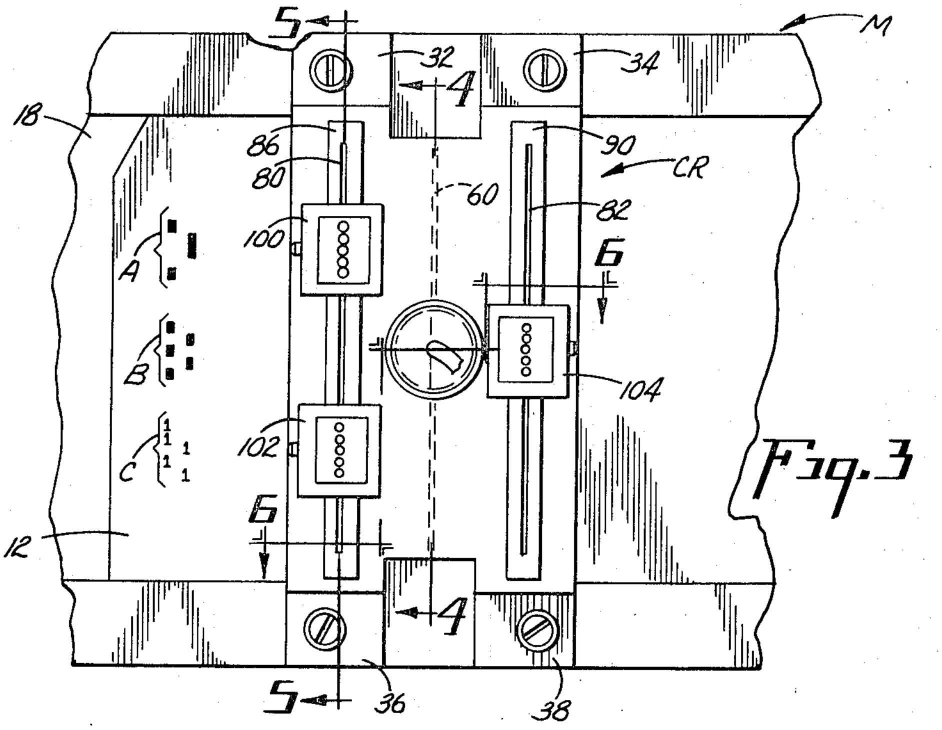
FIG. 3 is an elevational view of the code reader.

Protuberances 80 and 90 are sufficiently long that each may serve to carry a plurality of light sensor supports. Thus, as shown in FIG. 3, protuberance 86 carries sensor supports 100 and 102, whereas protuberance 90 carries a single sensor support 104. These sensor supports may be constructed of any suitable material, such as plastic, and each serves to carry an array of light sensors, such as photodiodes or phototransistors. Each sensor support may be displaced laterally along its associated protuberance and then secured in place, as with a set screw. For example, support 104 is shown in FIG. 6 as being secured to protuberance 90 by means of a set screw 106 which extends through one side wall of the support and into a laterally extending recess 108 provided in a side wall of protuberance 90. Protuberance 86 is also provided with a laterally extending recess 110 in one side wall for receiving similar set screws provided in supports 100 and 102.

Figures 8, 9, 10:
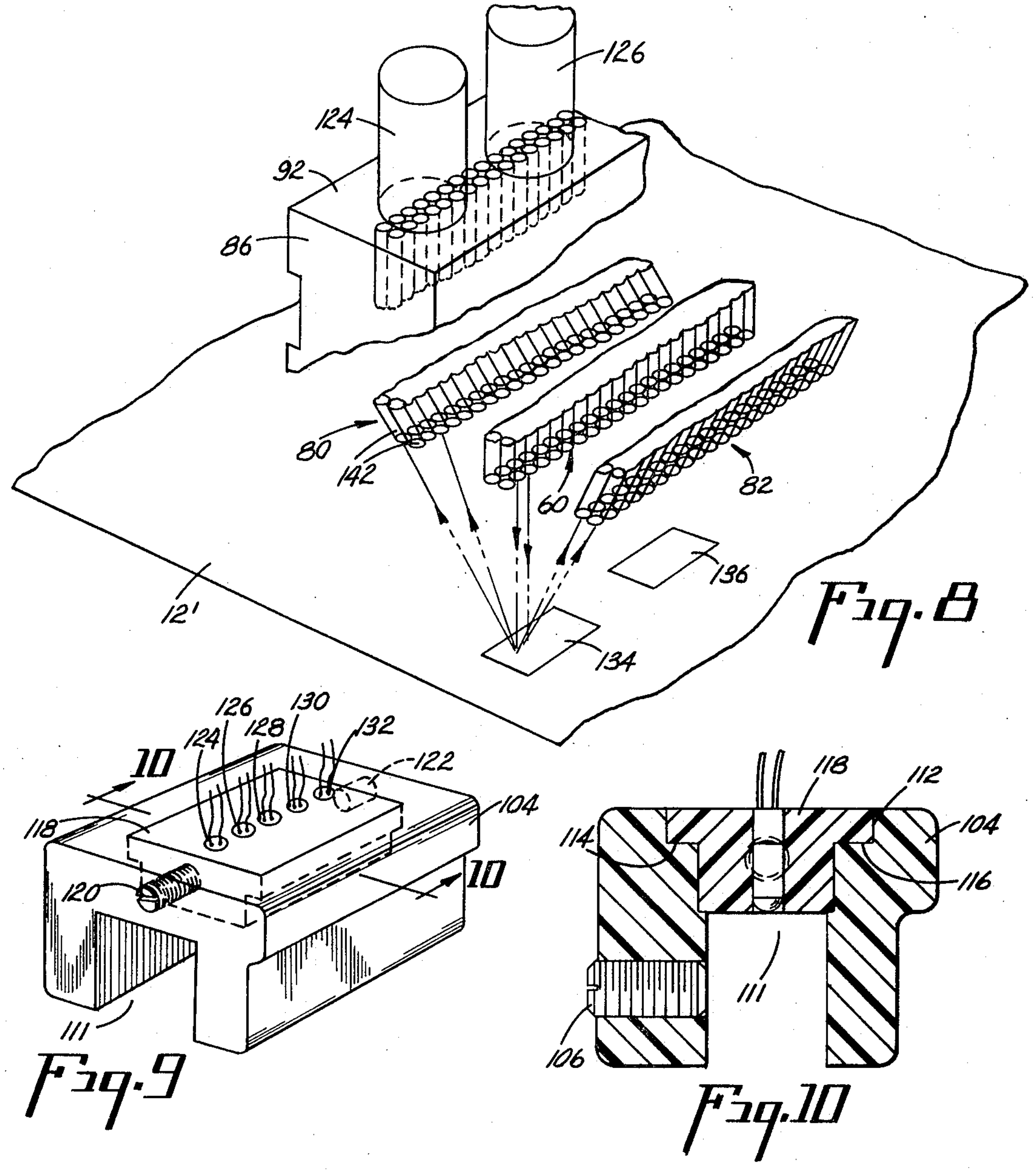
FIG. 8 is a simplified perspective illustration showing the manner in which light sensors may be positioned relative to fiber optic tubes carrying light from a coded member.
FIG. 9 is an enlarged perspective illustration showing one embodiment of the light sensor support member of the invention.
FIG. 10 is a sectional view taken along line 10—10 looking in the direction of the arrows of the embodiment shown in FIG. 9; and, FIG. 11 is a simplified sectional illustration of an alternative embodiment of the light sensor support member.

Each of the light sensor supports is constructed in the same manner as support 104, shown in detail in FIGS. 9 and 10. Support 104 is provided with an elongated channel 111 so that the support may be slidably received on protuberance 90. Set screw 106 extends through one side wall of the support so as to be received within recess 108 of protuberance 90. Support 104 is also provided with a light sensor array receiving slot 112 which, in cross section, as best shown in FIG. 10, is T-shaped to provide support shoulders 114 and 116. Slot 112 receives an array of photocells, which are supported in spaced relationship in a molded plastic block 118. Block 118 is T-shaped in cross section so as to be received in slot 112 and supported by shoulders 114 and 116. Block 118 is secured to support 104, as with a pair of set screws 120 and 122 threaded through opposite ends of support 104 to respectively engage opposite ends of block 118.

Block 118 carries a plurality of light sensors which may take various forms, such as phototransistors or photodiodes, in aligned, uniformly spaced apart relationship. The number of sensors carried by block 118 is dependent upon the number of code areas to be read within a particular code grouping. For purposes of illustration herein, the various code groups on tab card 12 are each shown as having five code areas. Consequently, block 118 carries five light sensors 124, 126, 128, 130 and 132, each having a light sensitive surface directed toward channel 111 so as to face the terminal ends of the fiber optic tubes in an associated array 80 or 82.

The relative geometry involved between the fiber optic tubes in arrays 80 and 82 relative to code areas on a coded card and to the photosensors may be readily appreciated with reference to the simplified illustration of FIG. 8 wherein a portion of array 80 is shown in conjunction with two code areas 134 and 136 on a card 12′ and a pair of corresponding light sensors 124 and 126. Array 80 is made up of a plurality of fiber optic tubes 142 and extend laterally relative to card surface 12′ and a pair of corresponding light sensors 124 and 126. The tubes in array 80 are packed in pairs in a direction extending longitudinally of card 12′. Each fiber optic tube 142 has a diameter on the order of approximately 0.002 inch. This is substantially smaller than the typical code area which may be employed in a code group. For example, each of the code areas 134 and 136 may have a length in the lateral direction of card 12′ on the order of 0.10 inch and a width in the longitudinal direction of card 12′ on the order of 0.05 inch. Consequently, several pairs of fiber optic tubes 142 may be associated with a given code area.

For purposes of illustration, five pairs of fiber optic tubes 142 are shown in FIG. 8 as being associated with each of the code areas 134 and 136, and three pairs of fiber optic tubes are located between adjacent ones of these code areas. Depending on the size of code areas employed in a particular code group, the spacing between code areas will vary as well as the number of pairs of fiber optic tubes. At the terminal ends of the fiber optic tubes 142, sensors 124 and 126 are provided so as to respond to light reflected from code areas 134 and 136 and received by their associated fiber optic tubes and transported through support 30. Each sensor is mounted so that its light sensitive surface is in substantial contact with surface 92 of protuberance 86 to receive light from associated fiber optic tubes. Depending on the size of its light sensitive surface, each sensor will receive light from a specified number of fiber optic tubes.

In the operation of card reader CR a tab card, such as card 12 in FIG. 3, is transported between the card reader and bed 18. For purposes of illustration, card 12 in FIG. 3 is shown as including three different code groups A, B and C which are respectively representative of a bar code, a Hollerith code and a computer ones code. In the bar code, group A, a group of five adjacent laterally aligned code areas are employed. Each code area within the code group is either opaque of white (the color of card 12). Each opaque area may be obtained by conventional means, such as with a printer or possibly accomplished manually with a black pen. The white areas are merely areas which have not been darkened. Consequently, the opaque areas serve as light absorbing or non-reflecting areas, whereas the white areas serve as light reflecting areas. The Hollerith code group B is similar to the bar code except that the opaque areas are obtained by cutting rectangular shaped slots in the cards. The opaque surface in itself is provided by an opaque section of layer 56 on bed 18. Whereas the entire layer 56 may be opaque it is only necessary that it be opaque in the area where sensing is to take place; to wit, where light from array 60 strikes the tab card. For purposes of illustration in FIG. 3, layer 56 is indicated as being opaque in the area behind card 12 at the location at which the Hollerith code group B is located. The computer ones group C is similar to code group A in that the code areas may be either white or opaque. However, the code areas which are opaque are merely a printed numeral "1."

Figure 7:
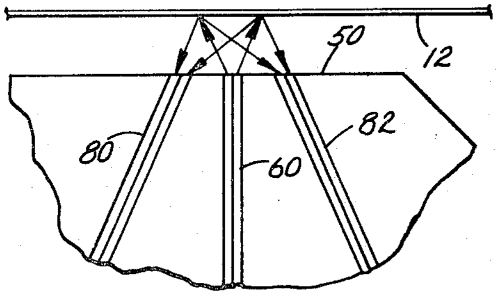
FIG. 7 is an enlarged schematic illustration showing the manner in which light is transmitted from the read head to a tab card and then reflected so as to be received by light conveying members in the read head.

Prior to reading a stack of cards, such as card 12, the various sensor blocks 100, 102 and 104 are positioned on their respective protuberances 86 and 90 so as to be properly aligned with the associated code groups. As each card 12 passes through card reader CR, array 60 transmits light from lens 74 through each of its fiber optic tubes so that a narrow pencil-like beam defined by two parallel boundary lines of light is transmitted to the surface of the card to illuminate a laterally extending surface area of the card of a width slightly less than the width of a code area and a length substantially equal to the height of card 12. As shown, for example, in FIG. 7, the light transmitted from each pair of tubes of array 60 is such that a narrow area of the card is illuminated and that light reflected therefrom is received by the tubes of both arrays 80 and 82 so as to be transported back to their terminal ends. The fiber optic tubes in arrays 80 and 82 are arranged coherently so that, as shown in FIG. 8, a specific group of fiber optic tubes receives light reflected from a specific code area, such as code area 134, and transports this light to a specific sensor, such as sensor 124. The spacing between sensors 124 and 126 in the illustration of FIG. 8 is dependent on the spacing between their respectively associated code areas 134 and 136. In view thereof, the spacing between the various sensors carried by supports 100, 102 and 104 will vary dependent upon the distances between the code areas of each of the code groups A, B and C. For this reason, support 104, shown in FIG. 9, is provided with a T-shaped slot 114 for receiving different sensor blocks 118 which, while of the same size, serve to support differently spaced sensors dependent on the type of code to be read.

Figure 11:
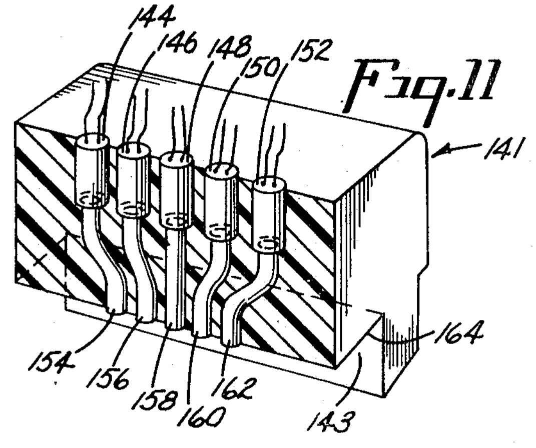

It is contemplated that some code types may be such that the code areas are spaced sufficiently close to each other, that it is difficult to similarly space associated light sensors. In such a case a support, such as support 141, shown in FIG. 11, may be employed. Support 141, shown in cross section, is provided with a U-shaped channel 143 so as to be received by either protuberance 86 or 90. In this embodiment, support 141 is provided with five sensor cavities to respectively receive sensors 144, 146, 148, 150 and 152. Fiber optic bundles 154, 156, 158, 160 and 162 extend from the light sensitive surface of sensors 144, 146, 148, 150 and 152, respectively, to a flat surface 164 which defines the roof of channel 143. Surface 164 is adapted to engage the flat surface 92 or 94 of protuberances 86 or 90, respectively. Tubes 154 through 162 have their respective light receiving surfaces polished and aligned so as to be flush with surface 164, and are spaced closer to each than sensors 144 through 152. This construction permits the sensors to respond to closely spaced code areas.

Whereas the invention has been described with respect to a tab card reader it is to be appreciated that the invention may also be employed for reading optical codes on rotatable discs and rotatable drums.

What is claimed is:

1. In a data sensing machine having a machine bed and a scan head with drive means for providing relative transporting movement of a code member on said bed and said scan head along a path, said drive means operable through a fixed cycle;

a code member having at least one row of indicia arranged transverse to said scan path;

an illuminating means for projecting radiant energy onto a field of said path at a predetermined relationship to said scan head;

the improvement comprising:

means for transmitting light so as to impinge upon a laterally extending single strip surface area extending in a transverse direction to said path in said field with the strip area defined by two parallel boundary lines of light, and said strip area being of sufficient length and width to illuminate a plurality of laterally spaced code areas on a said code member;

a plurality of light conveying means, each having one end positioned for sensing the light intensity reflected from an associated one of said laterally spaced code areas and to convey any light received therefrom to an opposite end positioned at a location remote from said code member, said opposite ends being spaced from each other to provide at said remote location a pattern of light and no light in dependence upon a pattern of code areas illuminated on said code member;

a lesser plurality of light sensors proximate to said remote location and associated with a selected group of said opposite ends for receiving any light therefrom in a coded pattern in dependence upon said coded pattern of a like group of said illuminated code areas; and means for adjustably positioning said light sensors relative to said opposite ends to sense different groups of said code areas;

whereby a data sensing machine may be set to interpret simultaneously plural sets of coded information represented by the row of indicia positioned within said single strip area, the location of said plurality of light sensors being optionally positioned at any location transversely of the scan path.

2. An improvement in a data sensing machine as set forth in claim 1, wherein said one end of said conveying means are uniformly spaced from each other by a distance dependent upon a distance between adjacent ones of said codes areas on a said code member.

3. An improvement in a data sensing machine as set forth in claim 1 wherein said opposite ends of said conveying means are uniformly spaced from each other and light sensors uniformly spaced from each other by a distance dependent upon the distance between adjacent said opposite ends.

4. An improvement in a data sensing machine as set forth in claim 1 further including a second said plurality of light conveying means, and a second said plurality of light sensors and a second said adjustable positioning means for positioning said second plurality of light sensors.

5. In a data sensing machine having a machine bed with a document guide defining a document path;

a document drive member having a peripheral surface which is mounted to intersect said guide path, means to move a known surface length of said member past a given line across said path in one cycle of operation; and means to hold a document in driven contact with said drive member surface for movement of a document length equal to said surface length;

the improvement comprising:

means for transmitting a laterally extending light beam to impinge upon a said document to illuminate a laterally extending surface area on said document, said surface area comprising a single strip area extending transverse to said path with the strip area being defined by two parallel boundary lines of light so that a plurality of laterally arranged code groups may be illuminated by said light beam;

a first plurality of light conveying members each associated with one of said code areas having one end positioned to receive light from said associated code area and an opposite end located at a remote position; and a lesser plurality of light sensors held together in spaced apart relation and adapted to be displaced relative to said opposite ends to receive light from only a selected group of said opposite ends to thereby respond to a selected one of said code groups.

6. A data sensing machine as set forth in claim 5 wherein said opposite ends of said conveying members are arranged in uniformly spaced apart relationship and said light sensors are spaced apart by distances dependent upon the distances between the associated ones of said opposite ends.

7. A data sensing as set forth in claim 5 including a first support member for supporting said conveying members so that said opposite ends are aligned and uniformly spaced apart, and a second support member for supporting said light sensors aligned in spaced apart relationship, said support members having cooperating means so that said members may be adjustably secured together whereby said sensors may be associated with selected different ones of said opposite ends.

8. An optical read head for sensing varying patterns of data comprising:

means for transmitting light through said optical read head to a plurality of apertures at a read station;

a plurality of light conveying members for carrying light to a remote position which is reflected at a read station from said transmitting means;

a lesser plurality of light sensors held together in spaced apart relation and positioned to receive light from a selected group of said plurality of light conveying members;

a first support means for supporting said plurality of conveying means;

a second support means for supporting said plurality of light sensors;

said first support means including an elongated protuberance having a terminating surface;

said second support means including walls therein defining a channel adapted to slidably receive said protuberance so that said second support means may be positioned at selected locations;

said second support means having apertures defined therein extending inwardly toward selected ones of said light conveying members;

said light sensors each mounted in one of the apertures of said second support means.

9. An optical read head as set in claim 8 wherein said conveying means extend through said first support means into said protuberance and terminate along a substantially flat surface.

10. An optical read head as set forth in claim 8 including means for conveying light in the openings of said apertures of said second support means to said sensors supported by said second support means.

11. An optical read head as set forth in claim 8 wherein said light transmitting means is carried by said first support means.

* * * * *